United States Patent
Davankov et al.

(10) Patent No.: US 7,588,687 B2
(45) Date of Patent: Sep. 15, 2009

(54) METHOD FOR SEPARATING ELECTROLYTES

(75) Inventors: Vadim A. Davankov, Moscow (RU); Maria P. Tsyurupa, Moscow (RU)

(73) Assignee: Purolite International, Ltd., Llantrisant (GB)

( * ) Notice: Subject to any disclaimer, the term of this patent is extended or adjusted under 35 U.S.C. 154(b) by 218 days.

(21) Appl. No.: 11/477,300

(22) Filed: Jun. 28, 2006

(65) Prior Publication Data

US 2007/0000837 A1    Jan. 4, 2007

Related U.S. Application Data

(63) Continuation of application No. PCT/US2005/036175, filed on Oct. 6, 2005.

(60) Provisional application No. 60/695,993, filed on Jul. 1, 2005.

(51) Int. Cl.
*B01D 15/08* (2006.01)

(52) U.S. Cl. .......... 210/635; 210/656; 210/198.2

(58) Field of Classification Search ........... 210/635, 210/656, 659, 198.2
See application file for complete search history.

(56) References Cited

U.S. PATENT DOCUMENTS

| | | | | |
|---|---|---|---|---|
| 3,729,457 A | * | 4/1973 | Davankov | 525/332.2 |
| 5,382,294 A | * | 1/1995 | Rimedio et al. | 127/42 |
| 5,486,289 A | * | 1/1996 | McCullough | 210/289 |
| 5,667,693 A | * | 9/1997 | Hester et al. | 210/635 |
| 6,323,249 B1 | | 11/2001 | Dale et al. | |
| 6,497,675 B1 | * | 12/2002 | Davankov | 604/6.09 |
| 6,808,635 B2 | * | 10/2004 | Brann | 210/656 |
| 7,112,277 B2 | * | 9/2006 | Bidlingmeyer et al. | 210/198.2 |
| 7,449,116 B2 | * | 11/2008 | Martosella et al. | 210/635 |
| 2002/0125142 A1 | * | 9/2002 | Sun et al. | 205/101 |
| 2002/0162386 A1 | * | 11/2002 | Taguchi et al. | 73/61.52 |
| 2003/0027879 A1 | * | 2/2003 | Davankov et al. | 521/82 |
| 2005/0123970 A1 | * | 6/2005 | Ozbal et al. | 435/6 |
| 2005/0156136 A1 | | 7/2005 | SenGupta et al. | |
| 2006/0169638 A1 | * | 8/2006 | Zelechonok et al. | 210/635 |

FOREIGN PATENT DOCUMENTS

| EP | 0987221 | 3/2000 |
|---|---|---|
| WO | WO-2005/069825 | 8/2005 |

OTHER PUBLICATIONS

Davanko, Reactive Polymers, 13 (1990), pp. 27-42.*

(Continued)

*Primary Examiner*—Ernest G Therkorn
(74) *Attorney, Agent, or Firm*—Darby & Darby P.C.

(57) ABSTRACT

The present invention is directed to a method of separating electrolytes by size exclusion chromatography using neutral microporous sorbent materials. Two types of sorbents have shown to be most promising: microporous non-functionalized hypercrosslinked polystyrene materials with a pore size comparable to diameters of hydrated electrolyte ions, and microporous activated carbons prepared by pyrolysis of hypercrosslinked polystyrene sorbent beads. In this method, a column comprising hypercrosslinked polystyrene sorbent beads is loaded with a solution of electrolytes, and then eluted with water. Electrolytes with the largest ions elute first, and those with the smallest ions elute last. Selectivity of separation rises with the concentration of the mixture to be separated. With concentrated initial mixtures, concentration of separated components exceeds their concentration in the initial mixture.

16 Claims, 5 Drawing Sheets

OTHER PUBLICATIONS

Davankov (Journal of Chromatography A, 965 (2002) 65-73.*

Davankov, V.A. et al, Selectivity in Preparative Separations of Inorganic Electrolytes by Size Exclusion Chromatography on Hypercrosslinked Polystyrene and MicroPorous Carbons, A.N. Nesmeyanov-Institute of Organoelemet Compounds, Russian Academy of Sciences, Jun. 2005, pp. 1-19.

Tsyurupa, M.P. et al., Sorption of Water and Electrolytes by Ion Exchange Resins and Neutral Sorbents with Hypercrosslinked Polystyrene Matrix, Ion Exchange Technology for Today and Tomorrow, 2004 pp. Abstract and pp. 342-346.

Tsyurupa M.P. et al.; A New Exclusion Chromatographic Process: Separation of Inorganic Electrolytes on a Neutral Hyper-Cross-Linked Polystyrene Sorbent; Nauka/Interperiodica; 2004; 198-200;vol. 398, No. 2; Russian Academy of Sciences; Moscow, Russia; Translated from Doklady Akademii Nauk.

Davankov V.A., Tsyurupa M.P. "Preparative frontal size-exclusion chromatography of mineral ions on neutral hypercrosslinked polystyrene" (2005) J. Chromatography. A, 1087: 3-12.

Davankov. V.A, Tsyurupa M.P., Alexienko N.N. "Competition between ions in size exclusion chromatography of electrolytes on neutral microporous materials" (2005) Mendeleev Commun., 15(5): 192-193.

Davankov, V. A. et al.; Selectivity in Preparative Separations of Inorganic Electrolytes by Size-Exclusion Chromatography on Hypercrosslinked Polystyrene and Microporous Carbons; Journal of Chromatography A; 1100 (2005); pp. 32-39; Elsevier.

European Search Report, mailed Jan. 29, 2009, which issued during the prosecution of European Application No. 05808380.9 which corresponds to the present application.

* cited by examiner

METHOD FOR SEPARATING ELECTROLYTES

CROSS REFERENCE TO RELATED APPLICATION

The present application is a continuation of PCT application No. PCT/US2005/36175, filed Oct. 6, 2005, and claims the benefit of U.S. patent application Ser. No. 60/695,993, filed Jul. 1, 2005, both of which are hereby incorporated by reference in their entirety.

TECHNICAL FIELD

The present invention is directed to a method of separating electrolytes (including acids, bases, and salts) by size-exclusion chromatography (SEC) and more particularly, is directed to a method of separating electrolytes by SEC having high selectivity and resulting in self-concentration of the electrolyte components.

BACKGROUND

Currently, SEC represents the most widespread method of determining molecular weight and molecular weight distribution of polymers. The method capitalizes on the difference in size of molecular species and their ability to penetrate into pores of the column packing material. Large species cannot enter smaller pores and, therefore, move with the mobile phase along the column with a higher velocity than that of smaller species which explore both large and small pores incorporating stagnant zones of the mobile phase. Though the theory that relates the size of macromolecular coils to diameters of accessible pores and the accessible portion of the total pore volume of the packing material, is far from being mature, the practical usefulness of SEC in the macromolecular research is beyond any doubt. However, SEC of polymers represents an analytical technique, employing injection into the column of a small portion of a diluted polymer solution, only, followed by the elution of the probe with the mobile phase. This precondition provides the independency of macromolecular coils from each other, and prevents any competition between them for space available to the mobile phase in the chromatographic column.

Thus far, only micro-preparative separations of macromolecular species that strongly differ in their size have been described, for instance, SEC separation of nanosponges from their clusters. Davankov V. A., Timofeeva G. I., Ilyin M. M., Tsyurupa M. P. (1997) *J. Polymer Sci., Part A: Polymer Chem.* 35: 3847-3852. On a larger scale, SEC (so-called gel filtration) operates in the purification of proteins from inorganic salts, the former being excluded from a hydrogel-type packing, while small inorganic molecules enter the gel phase and reside longer in the column.

Separation of inorganic ions by analytical-scale SEC is also well documented, mainly by publications of Yoza and co-workers, on densely crosslinked hydrogels, such as Sephadex G-15. Egan B. Z. (1968) *J. Chromatogr.* 34: 382; Yoza N., Ohashi Sh. (1969) *J. Chromatogr.* 41: 429-437; Ueno Y., Yoza N., Ohashi Sh. (1970) *J. Chromatogr.* 52: 321-327; Yoza N., Ogata T., Ohashi Sh. (1970) *J. Chromatogr.* 52: 329-338; Ogata T., Yoza N., Ohashi Sh (1970) *J. Chromatogr.* 58: 267-276; Yoza N. (1973), *J. Chromatogr.* 86: 325-349. Though the elution volumes of different hydrated ions were found to basically correlate with their size, the situation was often complicated by numerous side effects. Thus, interaction of nitrate or chlorate anions with the sorbent matrix or interaction of barium cations with the hydroxyl groups of the matrix cause retention of both these ions and their oppositely-charged partner ions, which results in the rise of the retention volumes of electrolytes over the value of the hold-up volume of the column. To date, no attempts have been made to apply SEC on neutral packings for preparative separations of electrolytes.

An entirely different area of research is represented by analytical-scale separations of diluted solutions of polymeric inorganic compounds on hydrogels, like Sephadex G-15 to G-50 (crosslinked dextran) or Bio-Gel A (crosslinked agarose). From the very beginning, these materials have been designed for gel permeation chromatography, so that size exclusion mechanisms of separation of inorganic polymers, as condensed phosphates, molybdophosphates, polymeric silicic acid and the like have been early recognized. A detailed review by Yoza (N. Yoza, *J. Chromatogr.*, 86 (1973) 325-349, Gel chromatography of inorganic compounds) also deals with additional effects that complicate the SEC separation mechanism, such as adsorption, ion exclusion, and secondary complexation equilibria in solution. As for simple metals and anions, a correlation has been observed between the retention and the radii of hydrated ions. N. Yoza, S. Ohashi, *J. Chromatogr.*, 41 (1969) 429-437, Chromatographic behavior of alkaline earth metal ions on Sephadex G-15 columns; J. Porath, *Metab. Clin. Exp.*, 13 (1964) 1004; Y. Ueno, N. Yoza, S. Ohashi, *J. Chromatogr.*, 52 (1970) 321.

Rona and Schmuckler eluted Dead Sea concentrated brine on a Bio Gel P-2 (crosslinked polyacrylamide) column with the result of obtaining a lithium-enriched fraction free from calcium and magnesium. M. Rona, G. Schmuckler, Talanta, 20 (1973) 273-240, Separation of lithium from Dead Sea brines by gel permeation chromatography. Bio Gel P, however, is known to retain cations and probably enter hydrogen-bond interactions between the anions and the amide hydrogen. The elution order of chlorides was thus different from one expected for size exclusion mechanisms, namely, $K^+$, $Na^+$, $Li^+$, $Mg^{2+}$, and $Ca^{2+}$, all emerging before the hold-up (dead) volume.

Processing of aqueous solutions of mineral electrolytes is the field of application of ion exchange chromatography. Cation and anion exchange resins readily retain, selectively or non-selectively, cations or anions from the initial solutions, thus leaving acids or bases, respectively, in the filtrate. To remove adsorbed ions from the resin and regenerate the used ion exchanger bed, appreciable amounts of acids or bases are needed. Moreover, all regeneration processes produce large volumes of strongly mineralized waste solutions that are expensive to neutralize and dispose.

To avoid the waste disposal problems, several reagent-free separation processes have been developed. One of them is based on the fact that the sorption selectivity of a resin may vary significantly with the temperature of the column. Muraviev & Hamizov, in Ion Exchange Technology for Today and Tomorrow, Proceedings of IEX2004, Ed. M. Cox, Cambridge, July 2004, 151-160, *Sustainable development and ion exchange: Green ion exchange technologies*. A desired component of a mixture of electrolytes can thus be preferably adsorbed by the ion exchanger at a low temperature and then released at an enhanced temperature. The method, however, requires cyclic heating and cooling of large columns, which is combined with energy consumption and furthermore reduces the life expectancy of the resin.

Other reagent free processes of separating electrolytes are based on phenomena of retardation of electrolytes by special ion exchangers. As early as 1950, A. B. Davankov et al. applied for and, five years later, received a USSR patent (Davankov et al., USSR Patent 100692 (1955)) for "A method of removing salts from aqueous solutions by using amphoteric ion exchange resins." For the first time, the polymeric material incorporated both cationic and anionic functional groups and, therefore, simultaneously retained both anions and cations of a dissolved salt. A real success in the removal and/or separation of electrolytes by that "ion retardation" process was achieved with amphoteric "snake-cage polyelectrolytes" suggested 1957 by Hatch, Dillon and Smith (M. J. Hatch, J. A. Dillon, H. B. Smith, Ind. & Eng. Chem., 49 (1957) 1812-1819, Preparation and use of snake-cage polyelectrolytes) and defined as a "cross-linked polymer system containing physically trapped linear polymer." These materials have been commercialized by Dow Chemical Co. under the name "Retardion." Dow Chemical Co., Midland, Mich., Tech. Service Bull. 164-62, "Ion Retardation." A typical snake-cage amphoteric polyelectrolyte, Retardion-550WQ2, was made by polymerizing ar-vinylbenzyl trimethyl ammonium chloride inside sulphonated cation exchanger Dowex-50W×2 and had strong basic and acidic functional groups. On a 100 ml column packed with this resin, a 20 ml sample of 2.0 M in $NH_4NO_3$ and 1.6 M in $HNO_3$ was almost completely separated into constituents. M. J. Hatch, J. A. Dillon, Ind.&Eng. Chem., Process. Design and Development, 2/4 (1963) 253-263, Acid Retardation. A Simple Physical Method for Separation of Strong Acids from Their Salts.

Similarly, 0.49 M $FeCl_2$ partially separated from 3.15 M HCl. M. J. Hatch, J. A. Dillon, Ind.&Eng. Chem., Process. Design and Development, 2/4 (1963) 253-263, Acid Retardation. A Simple Physical Method for Separation of Strong Acids from Their Salts. Other examples of "snake-cage polyelectrolytes" (M. J. Hatch, J. A. Dillon, H. B. Smith, Ind.&Eng. Chem., 49 (1957) 1812-1819, Preparation and use of snake-cage polyelectrolytes) are polyvinylpyridine entrapped in the network of a sulphonated polystyrene-divinylbenzene (PS-DVB) copolymer Dowex-50, or polyacrylic acid entrapped in the matrix of a strong basic PS-DVB anion exchanger Dowex-1. In general, ion retardation, a column absorption method, produced effective industrial separations of aqueous mixtures of strong electrolytes.

In 1958, in a theoretical study on activity coefficients of electrolytes in the resin phase, Nelson and Kraus arrived at a conclusion that, "because of the relatively low activity coefficients of HCl in the examined anion exchanger Dowex-1× 10," separation of HCl from concentrated halide solutions (LiCl, $MgCl_2$) is possible. F. Nelson, K. A. Kraus, J. Am. Chem. Soc., 80 (1958) 4154-4161, Anion-exchange studies. XXIII. Activity coefficients of some electrolytes in the resin phase.

Hatch and Dillon re-discovered 5 years later that conventional ion exchange resins efficiently separate concentrated acids from their salts under conditions that exclude normal ion exchange. M. J. Hatch, J. A. Dillon, Ind.&Eng. Chem., Process. Design and Development, 2/4 (1963) 253-263, Acid Retardation. A Simple Physical Method for Separation of Strong Acids from Their Salts. This finding contradicted the concept of "ion exclusion" according to which all strong electrolytes should be effectively excluded from absorption into ion exchange resins, because of the Donnan equilibrium effect. F. Helfferich, Ion Exchange, 1962, McGraw-Hill, N.Y., p. 134; R. M. Wheaton, W. C. Bauman, Ind.&Eng. Chem., 45 (1953) 228. The strong basic anion exchange resin Dowex-1×8 was found to function especially well, and the authors introduced a new term, "acid retardation." "Such separations can be defined as "acid retardation" separations, since they are based on a preferential absorption of strong acids, which causes the movement of the acid on the bed to be retarded—i.e., slowed down—relative to the movement of the salt." Acid retardation, like ion retardation can be done at high flow rates, especially at elevated temperatures. These processes have been optimized and since 1976 widely exploited by Eco-Tec, Canada on the industrial scale. C. J. Brown, V. Sheedy, M. Palaologou, R. Thompson, Proceedings of Annual meeting of minerals, metals, materials society, Orlando, Fla., USA, 1997, TP126. Interestingly, no satisfactory theoretical explanations of the acid absorption could be provided during the 40 years that passed after the appearance of the above classical works.

Recently, it has been suggested that the mechanisms of industrially important processes of "ion retardation" and "acid retardation" on amphoteric and anion-exchange resins, respectively, have much in common with SEC separations; and a new type of preparative chromatographic process has been described—namely, separation of simplest mineral electrolytes by means of frontal SEC of their aqueous concentrated solutions on neutral microporous materials. Tsyurupa M. P., Davankov V. A. (2004) Doklady Akad. Nauk RAN 398/2: 198-200; Davankov V. A., Tsyurupa M. P. (2005) J. Chromatogr. A, 1087: 3-12.

The size of hydrated mineral cations and anions is relatively small, on the level of several angstroms, and so their SEC separation requires using microporous stationary phases. Microporous neutral hypercrosslinked polystyrene sorbents proved to be very promising. These materials represent the first and up to now the only microporous non-functionalized polymeric adsorbing material with a pore size comparable to diameters of hydrated electrolyte ions. Several types of neutral hypercrosslinked polystyrene sorbents are currently manufactured by Purolite International (Pontyclun, UK) on an industrial scale. Hypersol-Macronet™ Sorbent Resins, Purolite Technical Bulletin, The Purolite Company, UK (1995). Another useful column packing material is microporous activated carbons prepared by pyrolysis of hypercrosslinked polystyrene sorbent beads. Aleksienko N. N., Pastukhov A. V., Davankov V. A., Belyakova L. D., Voloshchuk A. M. (2004) Russ. J Phys. Chem. 78/12: 1992-1998. Due to high rigidity of the framework of both the carbons and hypercrosslinked polystyrene, their largely hydrophobic micropores avoid collapsing and accommodate water that can be accessed by small molecules and ions.

Davankov et al. dealt with some distinguishing features of SEC that are most important for a preparative-scale process, such as:
species separated by an exclusion chromatography process are transported along the column by the mobile phase, but move faster than that mobile phase;
a size-exclusion column, being equilibrated with the mixture under separation, always incorporates a liquid the concentration of which remains reduced with respect to the excluded species;
concentration of all species that appear in the corresponding fractions of the effluent in a frontal size-exclusion chromatography rises again to the level of their concentration in the initial mixture, or, in other words, frontal SEC does not cause any dilution of solutes; and
rather the opposite, separation of a concentrated two-component mixture by SEC is connected with a self-concentrating effect of the components in the corresponding fractions of the effluent, according to inherent results of an "ideal separation process." Davankov V. A., Tsyurupa M. P. (2005) J. Chromatogr. A, 1087: 3-12.

Basic inherent drawbacks of all processes where one or all components under separation are retained by the sorbent is the fact that the elution of the retained components from the sorbent requires additional amounts of the eluent and thus results in an unavoidable dilution of the initial mixture with the respect to retained components. This is not the case with exclusion chromatography processes because excluded components do not depart from the mobile phase and emerge from the column in non-diluted state.

Another fundamental drawback of using hydrophilic adsorbing materials, like ion exchange resins, in practical separations of electrolytes is the fact that the resin beds change their volume with the concentration and pH of changing solutions. This shortens the lifetime of materials and significantly complicates the operation of large columns. Operating large units in industrial processes is beneficial compared to many cycles run on a smaller column. Mixing and dilution of chromatographic zones in exclusion chromatography take place on borders of the zones only. Therefore, the more cycles and borders, the more mixed and diluted the fractions.

SUMMARY

It is an object of present invention to provide a method of separating mineral bases, acids, and salts that does not have the above-mentioned drawbacks. Contrary to all separation techniques that exploit differential retention of all or certain electrolytes by column packing, due to one or another mechanism of interaction between the ions and functional groups of the sorbent, the process of the present invention exploits differential exclusion of ions from the micropores of a neutral column packing material, due to the different size of hydrated ions.

This kind of separation is called size exclusion chromatography (SEC) and it is a well-established technique for the determination of the size of individual macromolecules and the molecular weight distribution of polydispersed polymers. This analysis is generally performed with diluted polymer solutions. SEC is also used to separate large proteins or polysaccharides from low molecular weight contaminants, such as ammonium chloride.

Size-exclusion chromatography (SEC) of mineral electrolytes on non-functionalized microporous hypercrosslinked polystyrene and activated carbons on the basis of hypercrosslinked polystyrene sorbents is of significant interest from both practical and theoretical points of view. For separation of pairs of ions, selectivity of separation achieved by the present method is determined by the largest ions in each pair under separation. In contrast to other types of chromatography, the separation selectivity in SEC of electrolytes increases with an increase in the concentration of the initial mixture. Additionally, the practical value of the present method is further enhanced by the unique self-concentrating effect of both of the separated components. In accordance with the concept of an "ideal separation process", the self-concentration of the two components automatically results from the very fact of their separation.

High selectivity, combined with the self-concentrating effect of resolved components, renders the present SEC method as one of great practical importance. Furthermore, this process requires no auxiliary reagents and generates no mineralized waste flows. Thus, for example, processing of acidic pickle bath solutions, in order to isolate Cu, Al, Ni, etc. and save excess sulfuric acid, can prove economically feasible. Separation of more complex mixtures of electrolytes may also be of practical interest.

DETAILED DESCRIPTION OF THE INVENTION

Figure 1:
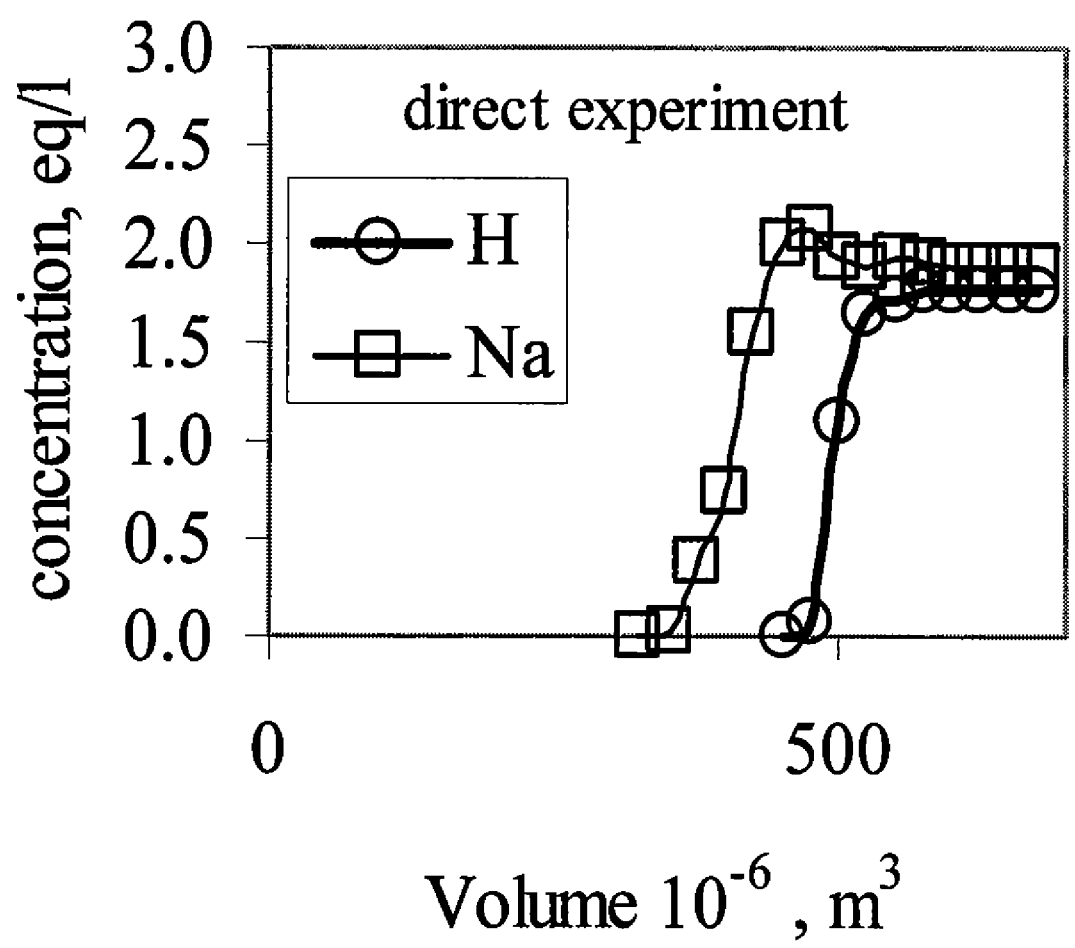
FIG. 1 is a chromatogram of a mixture of NaCl and HCl separated in accordance with the method of the present invention on a column of hypercrosslinked polystyrene (MN-202)

The present invention is directed to a method of separating electrolytes, including acids, bases, and salts, by size-exclusion chromatography (SEC) having high selectivity and resulting in self-concentration of the electrolyte components. Selectively, together with the extent of self-concentrating of the components, demonstrate the productivity of the present method and indicate is practical value.

The main reason for the absence in the past of attempts of separating mineral electrolytes by SEC is connected with the very small size of mineral ions, which requires the column packing material to be microporous in order to discriminate between the small ions. In aqueous solutions, mineral ions are strongly hydrated, so that the diameter of hydrated species amounts to about 0.5 to about 1.0 nm. To efficiently differentiate between and separate the ions within this narrow range of sizes, one needs column packing materials with micropores, preferably in the range of a few nm in diameter. Moreover, these small pores should comprise a major portion of the total pore volume, the latter preferably amounting to 0.5 $cm^3/g$ or more.

It is only recently that efficient microporous polymeric adsorbing materials have become available. In the early 1970s, hypercrosslinked polystyrene was obtained by an intensive post-crosslinking of beaded styrene-divinylbenzene copolymers in a highly swollen state. Davankov V. A., Rogozhin S. V., Tsyurupa M. P., U.S. Pat. No. 3,729,457. The crosslinks mainly represent —$CH_2$— fragments between phenyl rings of two neighbor polystyrene chains. Numerous conformationally rigid cross-bridges, inserted into the expanded network of the initial swollen copolymer, prevent the collapse of the final expanded structure on removal of the entrapped solvent (porogen) that was used during the crosslinking reaction. The final material has a reduced density and displays extremely high internal surface area (up to 1000-1800 m²/g). The rigid openwork-type structure of the hyper-crosslinked polystyrene remains accessible to small molecules from any gaseous and liquid media. Thus far, hypercrosslinked polystyrene represents the only neutral microporous polymeric adsorbing material that has been made commercially available. Hypersol-Macronet™ Sorbent Resins, Purolite International Company, 1995; Lewatit® VP OC 1163, Lewatit® S 7768, Bayer Chemicals, 2003.

Openings between polymeric chains in the hyper-crosslinked polystyrene material, which can be considered as a special kind of pores, are small—on the order of 2-3 nm. Besides these characteristic pores, beads of the sorbent can be provided with larger channels, up to 80 nm in diameter, which enhances mass transfer kinetics. Still, only micropores can contribute to the separation of mineral ions according to the size exclusion chromatography mechanism. The latter results in the faster emergence of large species at the outlet of the column, since only a reduced portion of pores is accessible to large ions.

In aqueous media, all mineral ions are strongly hydrated and they migrate together with their hydration shell. Therefore, the radius of hydrated ions matters in the separation, not the van der Waals radius of the atoms. Hydration of an ion generally increases with increasing charge density on the surface of the ion. In a series of equally charged ions, the smaller the van der Waals radius of the ion, the stronger its hydration. Multiple-charged ions are hydrated stronger. Reliable information on the resulting size of hydrated ions can be inferred from their electrophoretic mobilities in aqueous solutions. According to these data, cations and anions can be arranged in the following rows:

$Tris^+>>Li^+>Na^+\sim EtNH_3^+>NH_4^+\sim K^+>>>H_3O^+$ and
$Mg^{2+}\sim Zn^{2+}>Ca^{2+}\sim Sr^{2+}>Ba^{2+}>Li^+$,
$SO_4^{2-}\sim Acetate>Formate\sim F^->>NO_3^->Cl^-$
$>>>OH^-$.

When introducing a mixed solution of several cations and anions into a column packed with microporous hyper-crosslinked polystyrene or other microporous material, the pair comprised of the largest hydrated cation and the largest hydrated anion is expected to appear from the column first, while the pair comprised of the smallest cation and the smallest anion will elute last. Separation efficiency of the pairs is determined by the difference in sizes of corresponding cations and anions. Notice that in the rows of cations and anions presented above, hydrated proton and hydroxyl ion occupy the last positions. Therefore, if the mixed solution contains a salt and an acid or a salt and a base, the acid and the base will reside in the column longer than the corresponding salts. The method thus presents an opportunity to efficiently separate salts from acids or bases.

The regularities outlined above imply that the reason for the ion differentiation consists of the difference in sizes of the ions, rather than the difference in their interaction with the packing material. For this condition to be met, the packing material must be free of any functional groups. This is largely the case with microporous hypercrosslinked polystyrene-type sorbents and neutral microporous carbons. Even then, some ions display a noticeable affinity to the sorbent materials, as silver, nitrate, iodide, rhodanide and several other ions, as well as organic groups-containing anions. In this case, the retention phenomena contribute to the elution volume of salts or acids that contain the above anions or cations, thus enhancing or deteriorating the total separation of electrolytes, depending on the tendency of separation caused by the size exclusion phenomena. If the additional interactions deteriorate the basic separation effect, they can be suppressed in one way or another. For instance, if retentive dispersion interactions between the sorbent material and the organic part of the cation or anion deteriorate their separation from smaller ions, the above interactions may be reduced or suppressed by adding an organic modifier (e.g., methanol, ethanol or the like) to the initial electrolyte solution and the eluating mobile phase.

Adsorbing materials that incorporate functional groups, such as oxygen-containing, acidic or basic groups, which is the case with all hydrophilic column packing materials and ion exchange resins, are generally expected to enter specific interactions with some cations or anions of the electrolytes under separation. Therefore, the final separation of electrolytes on such materials is always determined by a superposition of all exclusion and retention phenomena.

Suitable column packing materials include, but are not limited to, neutral microporous polymeric, carbonaceous or mineral materials. They can be used in both beaded form or in the form of a continuous bed, the so-called monolith.

Beaded neutral microporous polymeric sorbents are commercially available as a series of hypercrosslinked polystyrene "Hypersol Macronet" by Purolite Int. (UK) and "Lewatit" by Bayer (Germany). Many other useful microporous hypercrosslinked polymers, as polysulfone, polyarylates, polyxylilene, etc., can be prepared according to procedures suggested in. M. P. Tsyurupa, V. A. Davankov, Reactive & Functional Polymers, 53/2-3, 193-203 (2002), Hypercrosslinked polymers: basic principle of preparing the new class of polymeric materials. Materials with a sufficient proportion of micropores also form by co-polymerization of styrene with more than 50 weight-% divinylbenzene in the presence of a polymer-solvating porogen. Most suitable porogens of this type are toluene and ethylene dichloride. Another perspective neutral separation material can be prepared by pyrolysis of hypercrosslinked polymers, that results in microporous carbonaceous beads of high mechanical strength. Still another perspective class of column packings consists of chemically and hydrolytically stable mineral materials, molecular sieves of the type of zeolyte, oxides of alumina, zirconia and molybdenum. In any case, however, it is important that these materials contain a sufficient amount of meso- and micropores, preferably in the range of 2.0 to 4.0 nm in size. A certain proportion of larger pores may enhance the shape of chromatographic zones of separated electrolytes, but do not contribute noticeably to the separation selectivity.

The size of beads of column packing material may vary between about 5 and 100 micron in a high-performance preparative chromatography and between 100 micron to about 2 mm in industrial separation processes. In each case monodisperse packings or packings with narrow bead size distribution should be preferred.

No functional groups of the column packing material are involved in the separation process of electrolyte solutions of the present invention. Therefore, such categories as exchange capacity or sorption capacity are no more applicable to the separation productivity of the process. Accordingly, the concentration of solutions of electrolytes under separation can be selected arbitrary, and high concentrations should be preferred. At high concentrations of the electrolyte pairs under separation, a new phenomenon is observed in separations that are carried out in accordance with the present invention. This is an effect of self-concentrating (V. Davankov, M. Tsyurupa, (2005) J. Chromatogr. A, 1087: 3-12, Preparative frontal size exclusion chromatography of mineral ions on neutral hypercrosslinked polystyrene), which implies that the concentration of the both electrolytes in the fractions obtained as a result of separation process, exceeds concentrations of these electrolytes in the applied initial mixture. The self-concentrating effect is the more expressed, the higher the concentration of the initial feed mixture. This unusual phenomenon substantially contributes to the practical value of the present invention.

The present invention is directed to a method of separating electrolytes by SEC using neutral microporous material, such as hypercrosslinked polystyrene sorbents. This method includes collecting separately fractions of the effluent that are enriched in, first, the largest cations and anions of the feed, then the middle size cations and anions, and, finally, the smallest cations and anions of the mixture. The hypercrosslinked polystyrene sorbent may be a microporous non-functionalized polymeric adsorbing material, such as one with a pore size comparable to diameters of hydrated electrolyte ions, or a microporous activated carbon prepared by pyrolysis of beaded hypercrosslinked polystyrene sorbents. Both types of sorbents have a rigid framework comprising largely hydrophobic micropores that avoid collapse and also accommodate water that can be accessed by small molecules and ions.

In the present method, a column comprising hypercrosslinked polystyrene sorbent beads is washed with distilled water, loaded with a solution of electrolytes to be separated (i.e., the feed solution) until the column becomes equilibrated with the feed solution (which means that the concentration of the column effluent becomes equal to that of the feed solution). In order to avoid eddy mixing of water with the feed, the more heavy feed solution is introduced into the column from the bottom up (upward flow). After column equilibration, the electrolytes are eluted by washing the column with water introduced from the top down (downward flow) using gravity flow or other suitable means. For viscous solutions, pressurized flow may be applied. In both the upward and downward flow stages, larger molecules flow through the column faster than smaller molecules whose migration is retarded by their entering micropores of the column beads. This method results in the selective separation and self-concentration of electrolyte components.

During the upward loading step, the electrolyte with larger ions emerges from the top of the column first, thus being separated from the feed mixture that follows until the column equilibrates. During the downward elution (washing) step, the electrolyte with smaller ions emerges from the outlet of the column last, thus being separated from the preceding feed mixture. "Selectivity" is defined as the distance between the fronts of chromatographic zones of separated components, expressed, e.g., in bed volumes of the column.

While the feed solution is being passed through the column, the column effluent is lo collected in fractions and the concentration of all components in fractions is determined by using any appropriate technique. First fractions contain pure water. Fractions that follow next, are enriched in the electrolyte that is composed of the largest cation and the largest anion of the initial mixture. This fraction presents one of the target components of the mixture under separation. Finally, fractions follow that are identical to the initial feed mixture. This part of the process is called direct frontal chromatography.

The next process, called reverse process, consists of passing water through the same column. Water initially generates fractions that are identical in their composition to the feed mixture. Then second target fraction follows that contains an electrolyte composed of the smallest cation and smallest anion of the mixture. Finally, pure water emerges from the column, which simultaneously implies that the column is fully regenerated and ready for a second separation cycle. If concentrated mixtures are subjected to separation in this kind of procedure, the direct process is better conducted by passing the mixed solution from the bottom to the top of the column, since this mixture has a higher density then water. The reverse process of passing water into the column that was equilibrated with the mixture, is then conducted from the top to the bottom. The two target fractions composed of largest and smallest ions, correspondingly, can be as large in volume as half of the bed volume or even larger. Moreover, they usually contain the separated electrolytes at enhanced concentrations, compared to the initial mixture. The middle fractions contain the unresolved mixture at normal concentrations, and these fractions are combined with the initial feed, in order to be separated in a next cycle.

A remarkable feature of the present invention is that both the eluent fraction of the electrolyte with the larger ions (that is recovered during the loading step) and the eluent fraction with smaller ions (that is recovered during the above washing step), contain the corresponding electrolytes with enhanced concentrations (compared to their concentration in the initial feed solution). In other words, separation of electrolytes according to the SEC principle results in the self-concentration of the two separated electrolytes. Selectivity, together with the extent of self-concentrating of the components, demonstrate the productivity of the present method and indicate its practical value. The more concentrated the starting feed solution, the better both the selectivity that may be achieved and the self-concentration effect.

Suitable column resins that may be used with the present invention include neutral and functionalized hypercrosslinked polystyrene absorbing resins, such as microrporous sorbents with preferably unimodal pore size distribution, in which about 50% or more of the pores in the polymer have a diameter of about 1.5 nm (e.g., neutral MN-270 available from Purolite International). Other suitable resins are biporous sorbents, in which large transport pores of 80 to 100 nm in diameter penetrate microporous hypercrosslinked domains that have micropores of approximately the same diameter, 1.5 nm (e.g., neutral MN-202 available from Purolite International). It should be pointed out, however, that a reliable measurement of diameters of micropores is difficult to achieve, especially for rather flexible hypercrosslinked polystyrene materials that are capable of swelling even in liquid nitrogen. Therefore, the above data on the pore size should be used for orientation only. The pore volumes of above-mentioned resins amount to 1.0-1.1 $cm^3/g$ for MN-202 resins and the like, and 0.7-0.8 $cm^3/g$ for MN-270 resins and the like. These values will apply for both dry and swollen states since the volume of beads of the above materials does not change noticeably on wetting (at most, 5-7%).

Sulfonated resins (e.g., MN-500 available from Purolite International) belong to the same group of biporous products as MN-202 and, as a whole, have the same features of porosity. However, the introduction of noticeable amounts of the voluminous substituents (having an ion exchange capacity with respect to sulfonic groups of 2.2-2.8 meq/g) undoubtedly reduces accessible space in the micropores and the size of the latter. The same applies to the weak acidic cation exchange resin MN-600 that has carboxylic functional groups in the hypercrosslinked polystyrene matrix. Functional groups of MN-500, MN-600 or other functionalized hypercrosslinked resins do not participate in the main SEC separation process, but can enhance or deteriorate the total separation depending on the type of electrolytes under separation.

Experiments on pyrolysis of hypercrosslinked polystyrenes, resulting in new activated carbons (e.g., D4609 and D4610 available from Purolite International), showed that the pyrolysis process reduces the bead size by about two-fold. Depending on conditions of MN-500 pyrolysis, final carbonaceous materials have pores ranging from 0.5 to 1.0 nm in diameter. Therefore, it is logical to conclude that activated carbons used in accordance with the present invention may serve for suitable column packing, as well.

The present method may be used to separate electrolytes in any chemical solution and can be scaled up for industrial and commercial use according to conventional procedures. This method can be used, for example, to separate chemical components, purify chemicals (e.g., acids, such as HCl), and/or isolate and concentrate individual valuable chemicals.

EXAMPLES

The present invention is next described by means of the following examples. The use of these and other examples anywhere in the specification is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the appended claims, along with the full scope of equivalents to which the claims are entitled.

Example 1

The idea of separating mineral electrolytes under conditions of size-exclusion chromatography was checked by an attempt to separate hydrochloric acid and sodium chloride (FIG. 1).

A mixed solution of the two components in water was percolated through a 200-ml column packed with MN-202 (and equilibrated with water). This polymer exhibits higher affinity to HCl than NaCl. Indeed, breakthrough of sodium chloride was observed to occur before hydrochloric acid, so that about 120 cm$^3$ of neutral salt solution could be collected. After equilibrating the column with the two electrolytes, pure water was percolated through the material. In this inversed (desorption) experiment, HCl was observed to concentrate on the tail of the desorption zone. It is noteworthy that the concentration of HCl in this part of the effluent exceeded that in the initial mixed electrolyte solution. In this way, separation of mixtures of electrolytes becomes feasible, which is impossible via any ion exchange methods. This remarkable process requires no reagents, since after eluting electrolytes with water the column is ready forl a second separation cycle.

Example 2

The majority of experiments were carried out using home-prepared neutral hydrophobic hypercrosslinked polystyrene with the bead size between 300 and 1000 μm.

Preparation of the Microporous Hypercrosslinked Polystyrene Sorbent

The sorbent was synthesized similarly to the general procedure, published earlier. M. P. Tsyurupa, A. V. Volynskaya, L. A. Belchich, V. A. Davankov, *J. Appl. Polym. Sci.*, 28, 685-689 (1983). Thermal effects of interaction between macronen isoporous styrene polymers and solvents or precipitators for linear polystyrene 50 g of dry beads of styrene-0.7% DVB copolymer were swollen in 390 ml of ethylene dichloride containing 18.2 ml of monochlorodimethyl ether. After 2 h, 2.8 ml of stannic chloride in 30 ml of same solvent were added dropwise and the mixture was agitated for 15 h. After this, a new portion of 25.3 ml of SnCl$_4$ was introduced and the reaction mixture was heated at 80° C. for additional 10 h. Then the beads were filtered, and the catalyst was removed by washing the material with acetone, 0.5 N HCl and water.

Materials having similar properties are manufactured by Purolite Int. (UK) under the trade name Macronet Hypersol.

Separation of a Mixture of Calcium Chloride and Hydrochloric Acid

The sorbent in which all pores were pre-filled with water (by washing the material with ethanol and then with water), was placed into a column of 20 cm in length and 30 ml in volume. About two bed volumes of an aqueous solution 4 N in CaCl$_2$ and 4 N in HCl were passed through the column at a flow rate of 0.7 ml/min ("forward" experiment). The concentration profile of the effluent was determined with respect to the both components. Then the electrolytes were displaced from the column by water ("reverse" experiment) and their concentration at the outlet of the column was determined as well.

The initial sample solution and then the eluent (pure water) were supplied from a reservoir under hydrostatic conditions. The effluent was collected in ca 1.2 ml fractions using a fraction collector and the weight of each fraction was determined. Concentrations of the both electrolytes in each fraction was determined by titrating a 200 μl aliquot of the fraction. Generally, the acid or the base was directly titrated in the aliquot and then the metal cation or the anion was selectively determined by titration. Thus, for the determination of calcium ions a 0.05 M EDTA solution in the presence of murrexide was used. The latter changed the color of the solution from crimson to lilac at the point of equivalence.

In many other cases, with selective indicators not available, the total concentration of electrolytes in the fraction was found by passing an aliquot of the effluent fraction through a bed of Dowex-50W×8, hydrogen form, washing the resin with water, and titrating the total electrolyte with a NaOH solution. Metal ion concentration equaled the total electrolyte concentration minus the acid concentration.

Figure 2:
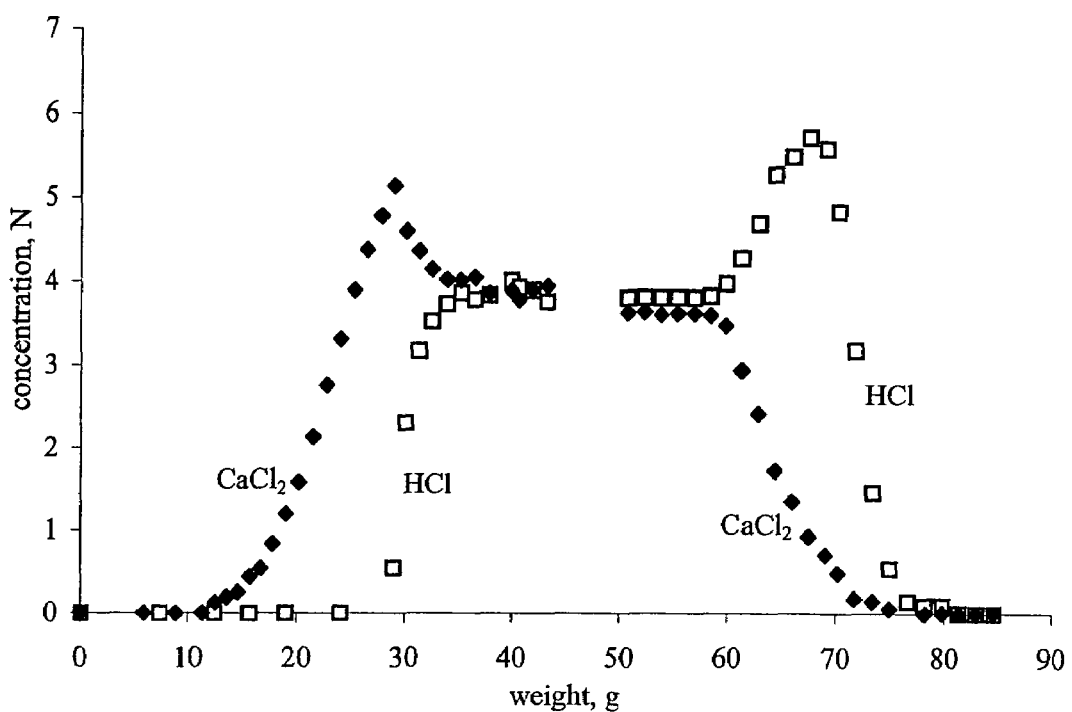
FIG. 2 is a chromatogram of the separation of 4 N $CaCl_2$ from 4 N HCl on hypercrosslinked polystyrene in accordance with the method of the present invention.

FIG. 2 presents results obtained by the separation of the mixed solution, 4 N in CaCl$_2$ and 4 N in HCl. The distance between the elution fronts of CaCl$_2$ and HCl amounts to about 16 ml, which corresponds to about half of the bed volume. Concentration of CaCl$_2$ in the forward experiment peaked out to 130%, that of HCl in the reverse experiment to over 150% of the corresponding concentration values in the initial mixture.

Example 3

Separation of a mixture of sodium sulfate and sodium hydroxide

Figure 3:
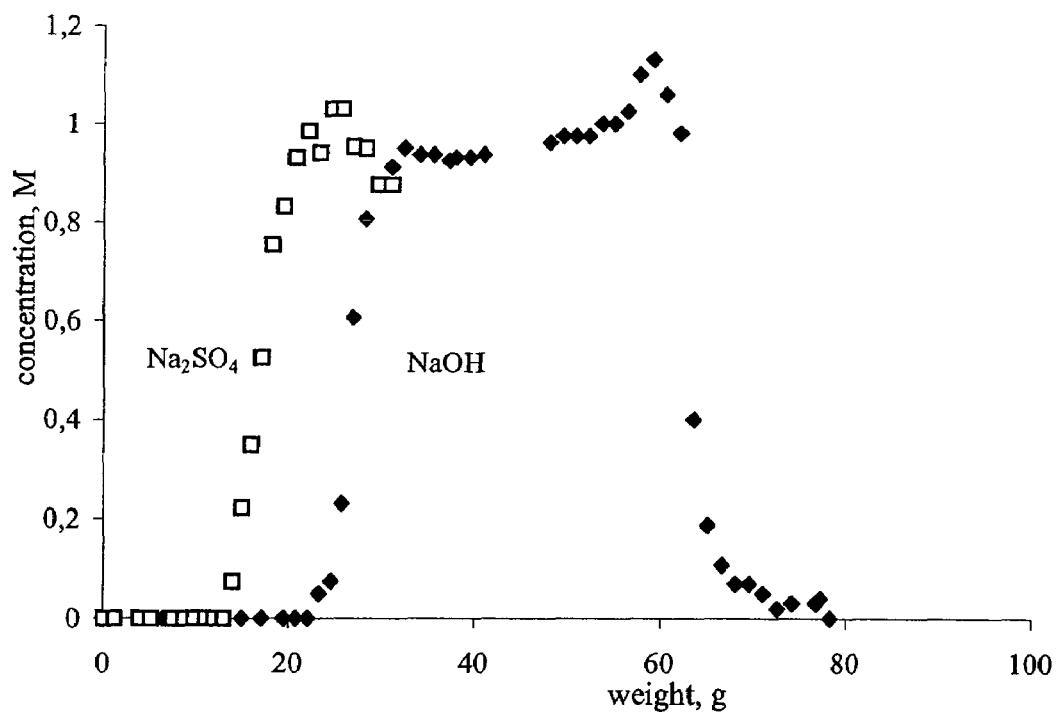
FIG. 3 is a chromatogram of the separation of 1 M $Na_2SO_4$ from 1 M NaOH on hypercrosslinked polystyrene in accordance with the method of the present invention.
Figure 4:
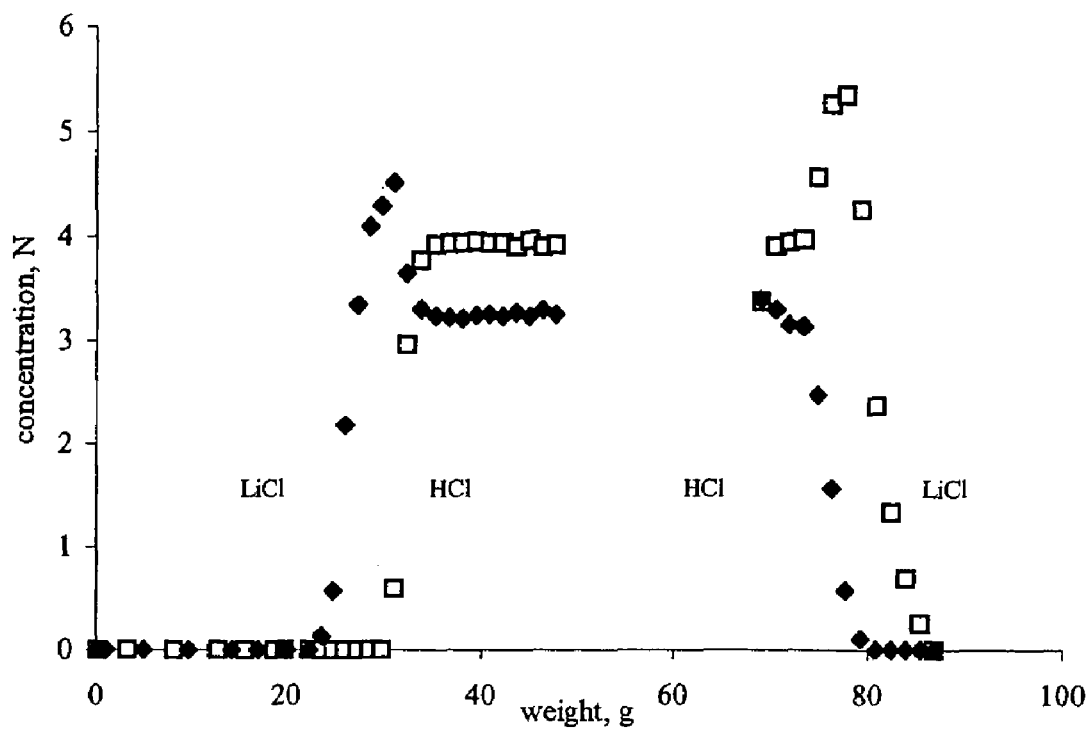
FIG. 4 is a chromatogram of the separation of 3 N LiCl from 4 N HCl on activated carbons based on hypercrosslinked polystyrenes (D4610)
Figure 5:
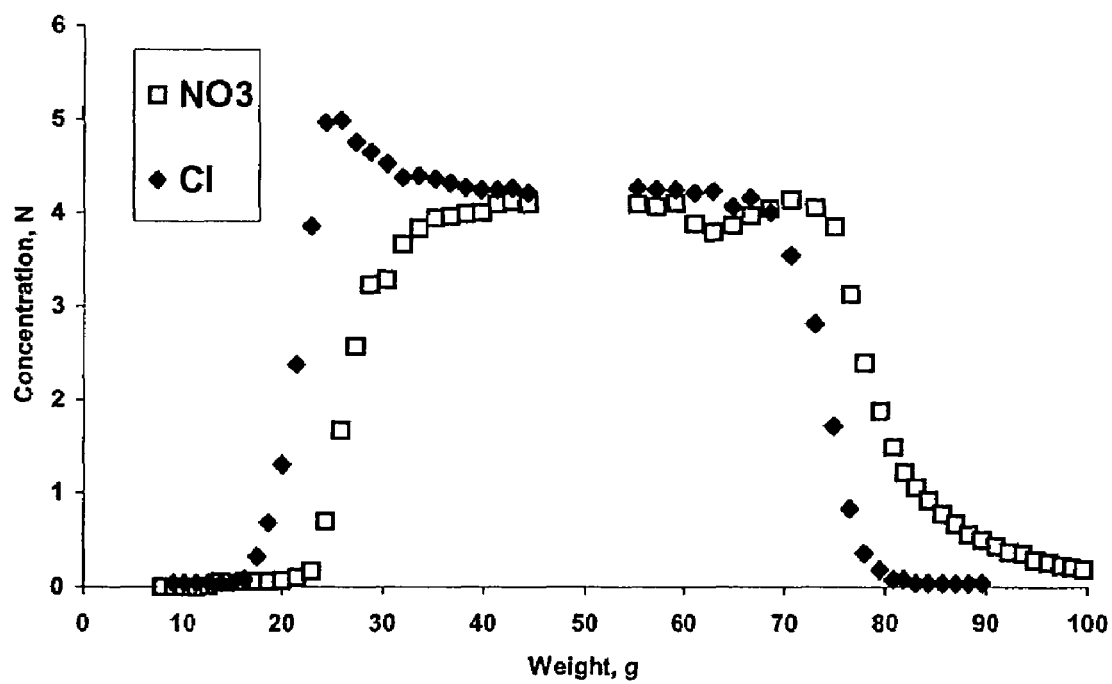
FIG. 5 is a chromatogram of the separation of 4 N $CaCl_2$ from 4 N $Ca(NO_3)_2$ on activated carbons based on hypercrosslinked polystyrenes (D4609)

On the hypercrosslinked polystyrene sorbent described in Example 2 and using technique described in Example 2, a mixed solution 1 M in Na$_2$SO$_4$ and 1 M in NaOH was separated. FIG. 3 presents results obtained by the separation. The distance between the elution fronts of Na$_2$SO$_4$ and NaOH amounts to about 10 ml, which corresponds to about one third of the bed volume. Because of the relatively low concentration of the initial mixture, the self-concentrating effect of resolved components is insignificant, amounting to about 10%.

Example 4

Separation of a Mixture of Lithium Chloride and Hydrochloric Acid

In this case, an experimental sample of activated carbon, D4610 (Purolite Int., UK), was used that was prepared by pyrolysis of a hypercrosslinked polymer. A mixture 4 N in HCl and 3 N in LiCl was separated.

Example 5

Separation of a Mixture of Calcium Chloride and Calcium Nitrate

In this case, an experimental sample of activated carbon, D4609 (Purolite Int., UK), was used that was prepared by pyrolysis of a hypercrosslinked polymer. A mixture 4 N in $CaCl_2$ and 4 N in $Ca(NO_3)_2$ was separated. $CaCl_2$ was observed to elute first.

Example 6

Table 1 presents an overview of separations obtained on hypercrosslinked polystyrene and microporous carbon under conditions identical to those of Example 2. In order to give an idea about productivity of the separation process, the distance Δ between the emergence of fronts of the first and second eluting components is presented in bed volumes (BV) of the column, when measured at the height of 5% of the initial concentration of these components in the feed. The extent of self-concentrating of the separated components is also given. Remarkably, both the separation selectivity and the extent of self-concentrating of separated components increase with the rise in the concentration of the initial feed mixture.

and MN-202), and a second type was a sulfonated resin (MN-500). A third type of studied sorbents consisted of experimental new activated carbons (D4609 and D4610), both of which were received from Purolite International.

Ethylene diamine tetraacetic acid (EDTA) disodium salt dihydrate, $CaCl_2.2H_2O$, $Ca(NO_3)_2.4H_2O$ and $Al_2(SO_4)_3.18H_2O$ were purchased from Acros Organics (Belgium). Mercury(II) acetate was purchased from Aldrich (UK). Other chemicals were purchased from Reakhim (Russia). All the above compounds were used without additional purification.

Procedure

The tested sorbent (with beads of 0.3 to 1.2 mm in diameter for the polymeric sorbents and 0.3-0.8 mm for the activated carbons) was placed into a 30 ml glass column (20 cm in height). All pores in the sorbent were pre-filled with water by washing the sorbent with ethanol and then excess water. A solution of electrolytes was passed through the column from its bottom to the top ("forward" experiment). Once the column had been equilibrated with the feed solution, the electrolytes were pushed out of the column by washing the sorbent with pure water from the top to the column bottom ("reverse" experiment). In both experiments, the liquids were transported by gravity at a flow rate of 0.5-0.7 ml/min. Fractions of effluent having volumes of around 1.3 ml each were collected by a fraction collector. For a more precise monitoring of the effluent, weight of each fraction was determined before analyzing the composition of fractions in appropriate aliquots. After the electrolytes were completely removed from the sorbent, for safety reasons, the latter was additionally washed with 250-500 ml water, and the next experiment with another pair of electrolytes was carried out.

Analysis of Electrolytes

The concentration of electrolytes in each fraction of effluent was determined by titration. Concentrations of acids and bases (protons and hydroxyls) were determined by direct titration of 200 μl aliquots with alkali or acid solutions in the

TABLE 1

| | Hypercrosslinked Polystyrene | | | Microporous carbon D4609 | | |
|---|---|---|---|---|---|---|
| Mixture | Concentration, N | Δ BV | Concentrating extent | Concentration, N | Δ BV | Concentrating extent |
| $CaCl_2$ | 3.8 | 0.46 | 1.43 | 3.8 | 0.45 | 1.5 |
| HCl | 3.8 | | 1.50 | 3.8 | | 1.6 |
| $Na_2SO_4$ | 0.94 | 0.35 | 1.2 | 1.07 | 0.36 | 1.2 |
| NaOH | 0.98 | | 1.3 | 0.94 | | 1.3 |
| $H_2SO_4$ | 4.0 | 0.21 | 1.04 | 4.5 | 0 | 1.0 |
| HCl | 3.9 | | 1.12 | 3.5.4 | | 1.0 |
| $FeSO_4$ | 2.15 | 0.31 | | 2.3 | 0.58 | |
| $H_2SO_4$ | 2.77 | | | 2.7 | | 1.15 |
| $Al_2(SO_4)_3$ | 1.0 | 0.28 | | 1.0 | 0.5 | |
| $H_2SO_4$ | 1.33 | | | 3.3 | | 1.1 |
| KCl | 1.0 | 0.16 | 1.0 | | | |
| HCl | 4.0 | | 1.1 | | | |
| LiCl | 12.0 | ~5 | 1.0 | 3.3 | 0.21 | 1.35 |
| HCl | 0.06 | | ~15 | 3.9 | | 1.40 |
| $CaCl_2$ | 1.75 | <0.1 | 1.0 | 4.2 | 0.23 | 1.25 |
| $Ca(NO_3)_2$ | 1.6 | | 1.0 | 4.0 | | 1.1 |

Example 7

Two types of hypercrosslinked polystyrene sorbents produced on an industrial scale by Purolite International (UK) were studied. One type consisted of neutral resins (MN-270 presence of phenol phthaleine or methyl orange. When separating mixtures of sulfuric acid with metal sulfates, a 200 μl aliquot of each fraction was first titrated with 0.2 N NaOH solution to the methyl orange end point to give the concentration of the excess acid. Then, an equal aliquot of the effluent was introduced into a column packed with 10-15 ml of cation exchanger Dowex 50×8 in $H^+$-form, followed by washing the resin with 30-40 ml of water and titrating the filtrate with NaOH, to give the sum of the free acid and that released through exchange of metal cations by protons. Thus, the concentration of $FeSO_4+CuSO_4$ or $Al_2(SO_4)_3$ was calculated as the difference between the above two titration results. Similarly, the concentration of $Na_2SO_4$ in its mixture with NaOH was determined by adsorption of NaOH and conversion of $Na_2SO_4$ into $H_2SO_4$ through the ion exchange on Dowex 50×8.

To determine the concentration of chloride anions, a 200 μl aliquot of an effluent fraction was dissolved in 10 ml water, 10 ml ethanol and 4 ml of 0.5 N $HNO_3$; two drops of Bromphenol Blue solution and seven drops of diphenylcarbazone solution were added and the probe was titrated with 0.2 N $Hg(OAc)_2$ solution (provided with 3 ml of 70% $HNO_3$ per 1.0 L solution) until the color of the probe changed from yellow to violet. Calcium ions in a 200 μl probe, diluted with 20 ml water, were titrated with 0.05 M EDTA solution in the presence of murexide and 1.0 ml 5 N NaOH solution, taking the change in color from crimson to lilac as the end point.

Results and Discussion

Figure 6:
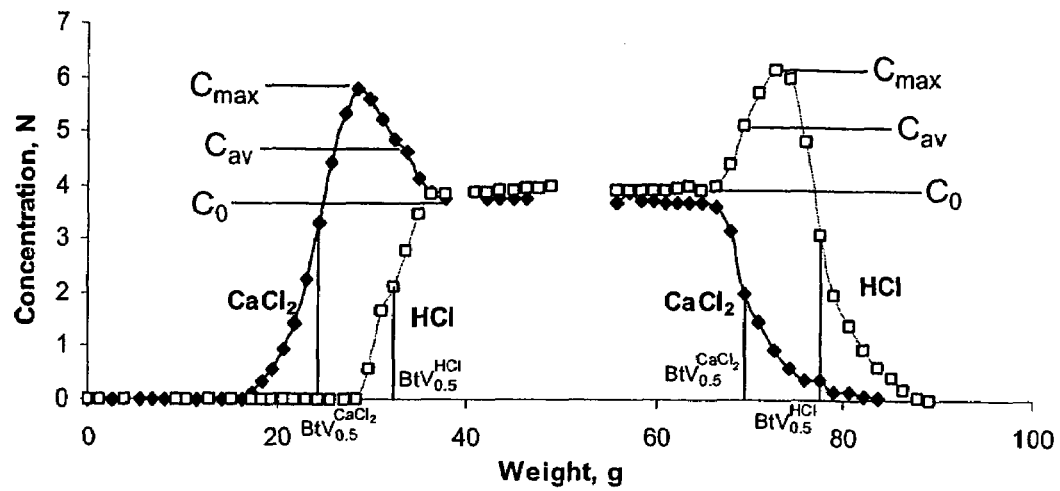
FIG. 6 is a chromatogram of a concentrated mixture of $CaCl_2$ and HCl separated in accordance with the method of the present invention on a column of hypercrosslinked polystyrene (MN-270)

FIG. 6 presents a typical chromatogram obtained by transporting a rather concentrated mixture of two electrolytes upwards from the bottom to the top of a 30-ml column packed with a microporous material ("forward" experiment), until the column is equilibrated with the mixture, and then replacing the electrolytes from the column with pure water introduced from the top of the column downwards ("reverse" experiment). Substantial divergence of elution fronts of $CaCl_2$ and HCl is evident from FIG. 6, as well as the remarkable self-concentrating that occurs within the $CaCl_2$ and HCl fractions (that can be isolated in the forward and reverse experiments, respectively).

It is hardly possible to characterize quantitatively the results of the present separation method in terms of conventional selectivity values and plate numbers. Therefore, for practical reasons, breakthrough volumes, $BtV_{0.05}$, were determined in the forward experiments at the 5%-level of the initial concentration of each of two electrolytes under separation. From a theoretical point of view, breakthrough volumes measured at the half of the height of the concentration waives, $BtV_{0.5}$ are more meaningful. These values were estimated for both the forward and reverse experiments. In the forward experiment, the difference ($\Delta_1$) between $BtV_{0.5}$ values of the two separated electrolytes, when divided by the bed volume (30 ml), was thought to characterize the selectivity of the separation (expressed in bed volumes) with respect to the faster moving component.

Selectivity ($\Delta_2$) of isolation of the slower moving component similarly results from the difference between two $BtV_{0.5}$ values determined in the reverse experiment. These values are presented in Table 2 for a series of electrolyte mixtures examined on hypercrosslinked polystyrene-type sorbents. In each pair of electrolytes in Table 2, the first line of data corresponds to the faster moving electrolyte, whereas second line of data characterizes the slower moving component.

TABLE 2

Separation of electrolytes on hypercrosslinked polystyrene resins

| | MN-270 | | | | | | MN-202 | | |
| --- | --- | --- | --- | --- | --- | --- | --- | --- | --- |
| Electrolyte | $C_0N$ | $BtV_{0.05}$ ml | $BtV_{0.5}$ ml | $C_{max}/C_0$ | $\Delta$ BV | P BV | $C_0N$ | $BtV_{0.05}$ ml | $BtV_{0.5}$ ml |
| $CaCl_2$ | 3.6 | 15 | 22.5 | 1.34 | 0.25 | 0.29 | 3.5 | 18 | 23.4 |
| HCl | 3.8 | 28 | 30.0 | 1.50 | 0.25 | 0.31 | 3.9 | 27.5 | 29.5 |
| LiCl | 2.1 | 16.2 | 20.9 | 1.08 | 0.24 | 0.25 | 3.85 | | 23.5 |
| HCl | 2.1 | 25.8 | 28.0 | 1.36 | 0.20 | 0.24 | 4.0 | | 29 |
| KCl | 1.2 | 14 | 17.3 | 1.08 | 0.19 | 0.20 | | | |
| HCl | 4.2 | 21 | 22.9 | 1.08 | 0.17 | 0.18 | | | |
| $H_2SO_4$ | 4.0 | 17 | 22.4 | 1.07 | 0.14 | 0.14 | 4.0 | 20.5 | 24.9 |
| HCl | 3.9 | 23 | 26.5 | 1.12 | 0.05 | 0.05 | 3.9 | 23.5 | 26.8 |
| $Na_2SO_4$ | 1.8 | 13.5 | 17.0 | 1.17 | 0.32 | 0.35 | | | |
| NaOH | 0.95 | 23 | 26.5 | 1.15 | | | | | |
| $(Fe + Cu)SO_4$ | 2.15 | 13 | 18.0 | | 0.28 | 0.28 | | | |
| $H_2SO_4$ | 2.75 | 19 | 26.4 | | | | | | |
| $Al_2(SO_4)_3$ | 0.9 | 13 | 18.0 | | 0.26 | 0.26 | | | |
| $H_2SO_4$ | 3.4 | 18 | 25.7 | | | | | | |
| $CaCl_2$ | | | | | | | | 1.8 | 23.4 |
| $Ca(NO_3)_2$ | | | | | | | | 1.7 | 24.9 |
| NaCl | | | | | | | | 1.9 | 23.3 |
| NaOH | | | | | | | | 2.2 | 23.3 |

| | MN-202 | | | MN-500 | | | | | |
| --- | --- | --- | --- | --- | --- | --- | --- | --- | --- |
| Electrolyte | $C_{max}/C_0$ | $\Delta$ BV | P BV | $C_0N$ | $BtV_{0.05}$ ml | $BtV_{0.5}$ ml | $C_{max}/C_0$ | $\Delta$ BV | P BV |
| $CaCl_2$ | 1.14 | 0.20 | 0.22 | | | | | | |
| HCl | 1.41 | 0.15 | 0.18 | | | | | | |
| LiCl | 1.15 | 0.18 | 0.19 | | | | | | |
| HCl | 1.45 | 0.14 | 0.17 | | | | | | |
| KCl | | | | | | | | | |
| HCl | | | | | | | | | |
| $H_2SO_4$ | 1.05 | 0.06 | 0.06 | 4.5 | 18 | 23.2 | 1.00 | 0.05 | 0.05 |

TABLE 2-continued

Separation of electrolytes on hypercrosslinked polystyrene resins

| | | | | | | | | | |
|---|---|---|---|---|---|---|---|---|---|
| HCl | 1.07 | 0.05 | 0.05 | 3.5 | 19 | 24.6 | 1.06 | 0 | |
| Na$_2$SO$_4$ | | | | | | | | | |
| NaOH | | | | | | | | | |
| (Fe + Cu)SO$_4$ | | | | | | | | | |
| H$_2$SO$_4$ | | | | | | | | | |
| Al$_2$(SO$_4$)$_3$ | | | | | | | | | |
| H$_2$SO$_4$ | | | | | | | | | |
| CaCl$_2$ | 1.01 | 0.05 | 0.05 | 4.0 | 19.5 | 23 | 1.00 | 0.05 | 0.05 |
| Ca(NO$_3$)$_2$ | 1.06 | 0.08 | 0.08 | 4.3 | 19.5 | 24.5 | 1.06 | 0.05 | 0.05 |
| NaCl | 1.0 | 0 | 0 | | | | | | |
| NaOH | 1.0 | 0 | 0 | | | | | | |

Table 3 presents the corresponding data for the two activated carbons examined.

TABLE 3

Separation of electrolytes on activated carbons

| | Carbon D4609 | | | | | | Carbon D4610 | | | | | |
|---|---|---|---|---|---|---|---|---|---|---|---|---|
| Electrolyte | $C_0$N | BtV$_{0.05}$ ml | BtV$_{0.5}$ ml | $C_{max}/C_0$ | Δ BV | P BV | $C_0$N | BtV$_{0.05}$ ml | BtV$_{0.5}$ ml | $C_{max}/C_0$ | Δ BV | P BV |
| CaCl$_2$ | 3.75 | 17 | 23.6 | 1.56 | 0.28 | 0.36 | 7.3 | 23 | 27.5 | 1.26 | 0.25 | 0.28 |
| HCl | 4.0 | 30 | 31.0 | 1.54 | 0.24 | 0.30 | 3.1 | 24 | 35 | 1.84 | 0.13 | 0.18 |
| LiCl | | | | | | | 3.3 | | 24.5 | 1.42 | 0.24 | 0.29 |
| HCl | | | | | | | 3.9 | 30 | 31.7 | 1.37 | 0.16 | 0.19 |
| NaCl | 2.8 | 19 | 25 | 1.24 | 0.33 | 0.37 | | | | | | |
| HCl | 2.7 | 31 | 35 | 1.42 | 0.33 | 0.40 | | | | | | |
| H$_2$SO$_4$ | 4.5 | 24 | 26 | 1 | 0 | 0 | 3.7 | 27 | 28 | 1 | 0 | 0 |
| HCl | 3.4 | 24 | 26 | 1 | 0 | 0 | 4.3 | 27 | 28 | 1 | 0.03 | 0.03 |
| Na$_2$SO$_4$ | 1.2 | 15.3 | 18.3 | 2.1 | 0.35 | 0.54 | | | | | | |
| NaOH | 0.94 | 25.8 | 30.9 | 1.3 | | | | | | | | |
| (Fe + Cu)SO$_4$ | 2.3 | 15 | 18.4 | | 0.53 | | | | | | | |
| H$_2$SO$_4$ | 2.7 | 32 | 34.2 | 1.14 | 0.30 | 0.32 | | | | | | |
| Al$_2$(SO$_4$)$_3$ | 1.0 | 14 | 17.0 | | 0.47 | | | | | | | |
| H$_2$SO$_4$ | 3.3 | 28 | 31.1 | 1.06 | 0.47 | 0.48 | | | | | | |
| CaCl$_2$ | 4.2 | 16.5 | 21.2 | 1.18 | 0.17 | 0.19 | 3.8 | 22 | 26.3 | 1.13 | 0.12 | 0.13 |
| Ca(NO$_3$)$_2$ | 4.0 | 23 | 26.4 | 1.04 | 0.15 | 0.15 | 4.5 | 26 | 30 | 1.03 | 0.07 | 0.07 |
| NaCl | 2.9 | 17.3 | 21 | 1 | 0.18 | 0.18 | 1.7 | 22.7 | 25.7 | 1 | 0 | 0 |
| NaOH | 2.7 | 21.6 | 22.5 | 1 | 0 | 0 | 2.1 | 23.2 | 25.7 | 1 | 0 | 0 |

It is significant that the electrolyte separation selectivity Δ in the frontal SEC method of the present invention can amount to astonishingly high values, up to 0.5 bed volumes of the column. It is also noteworthy that the $\Delta_1$ and $\Delta_2$ values for the two separated components do not need to be equal.

In addition to selectivity, a second important quantitative parameter of the present separation method is the degree of self-concentrating of the isolated electrolytes, expressed as the ratio of the maximum concentration, $C_{max}$, of the corresponding isolated electrolyte to its initial concentration, $C_0$, in the feed mixture. The self-concentrating effect considerably enhances the practical value of the new process, and its total productivity. The estimated average concentration $C_{av}$ is graphically averaged over the total span Δ of fractions that contain isolated components; its ratio to the initial concentration presents the averaged self-concentrating coefficients $C_{av}/C_0$ for each of the two electrolytes. A product P of the Δ values with the corresponding averaged self-concentrating coefficients then characterizes the total productivity of the present separation method, which is expressed in bed volumes (BV) of the initial mixture from which the corresponding electrolyte can be (theoretically) isolated:

$$P = \Delta \cdot C_{av}/C_0.$$

Size of Ions and Selectivity of Their Separation

According to Manalo et al., the interstitial volume of a column that is packed with a beaded material of broad bead size distribution amounts to about 40% of the column volume. Manalo G. D., Turse R., Rieman W. M. (1959) *Analytica Chim. Acta* 21: 383-391. In, for example, a 30 ml column, the interstitial volume amounts to about 12 ml. In addition to this volume, the mobile phase (water) also occupies the porous volume within the sorbent, which can be evaluated from the true density and porosity of the material. The total volume of the mobile phase was directly estimated in the columns filled with MN-270 and MN-202 as 21.5 and 24.6 ml, respectively, by measuring the weight of dry polymer, the dry column, and the column filled with the polymer and water.

Theoretically, elution volumes of components separated in accordance with the present SEC method should vary between 12 ml for a totally excluded component and 21.5 and 24.5 ml for MN-270 columns (and the like) and MN-202 columns (and the like), respectively, for species of the size of a water molecule. The difference between elution volumes of the above extreme solutes should not be expected to exceed the total porous volume of the packing material, i.e., 9.5 to 12.5 ml or roughly one third of the column bed volume (BV).

However, the practically attainable selectivity (Δ) of the process may exceed this theoretical value several-fold, when working with highly concentrated electrolyte solutions.

As follows from FIG. 6 and Tables 2 and 3, in frontal chromatography experiments, fronts of $CaCl_2$, LiCl, NaCl and KCl move significantly faster through the SEC column than the front of HCl. As stated in Davankov V. A., Tsyuruypa M. P. (2005) J. Chromatogr. A, 1087: 3-12 "Since the salts and the acid in the above systems have the same chloride anion, the divergence of the salt and acid fronts is due to different behaviors of the proton and the metal cations in the (hyper-crosslinked) sorbent phase." This logical statement, however, does not generally imply that the distance between the two fronts, i.e., the selectivity of separation, is determined by the difference in sizes of the above metal cations, on one side, and the hydrated proton, on the other.

The effective size of protons (hydroxonium ions) in the considered chromatographic system can be set close to zero. Protons and hydroxyl anions do not need to migrate through the column at all, since a rapid shift of electrons along "a hydrogen-bonded water wire" (i.e., the chain of hydrogen bonds between water molecules in an aqueous media) can immediately generate a positive or negative charge in any position of that aqueous phase where a charge is required. The positive or negative charge corresponds to a hydroxonium or hydroxyl ion, respectively. In fact, the electron-proton-coupled transfer of a charge in an aqueous phase proceeds by electrons hopping along the "wire" with the protons in the chain of hydrogen bonds hopping in the opposite direction. Therefore, the migration velocity of the HCl front is entirely determined by the movement of chloride anions, rather than that of protons. Due to the local electroneutrality principle, protons emerge in close vicinity of moving chloride anions, probably without noticeably retarding the movement of the latter. Similarly, the migration velocity of a base MOH through a neutral sorbent bed must be entirely determined by the rate of migration of the $M^+$ cation, with the hydroxyl anion emerging close to the moving cation.

The velocity of the front of a metal chloride must be largely determined by the rate of movement of the largest ion of the salt, which is stronger excluded from the porous space of the packing material and, therefore, has to migrate faster than the smaller counter-ion. Of the ions under consideration, the hydrated radius (Nightingale E. R. (1959) J. Phys. Chem. 63: 1381-1387) of cations $Ca^{2+}$, $Li^+$, and $Na^+$ decreases in the given order (4.12, 3.82, and 3.58 Å respectively), all of them being larger than the radius of the $Cl^-$ anion (3.32 Å). Of course, chlorine anions are bound to migrate right after their larger partner cations, likely slowing down the resulting velocity of the pair to a certain degree.

From this, it logically follows that the total selectivity of separation of two electrolytes, MCl and HCl, is mainly caused and determined by the difference in sizes of the cation $M^+$ and anion $Cl^-$, the largest ions of the two electrolytes under separation, not those two ions ($M^+$ and $H^+$) that make the electrolytes differing from each other. This rather non-trivial chromatography expectation finds strong support in the results of the present method of separating two pairs of electrolytes, NaCl/HCl and NaCl/NaOH on a column of carbon D4609. In the first pair, the rate-determining species are $Na^+$ and $CF^-$ with ionic radii of 3.58 and 3.32 Å, respectively. The difference in their sizes is not too large, but, obviously sufficient for a successful separation.

Figure 7:
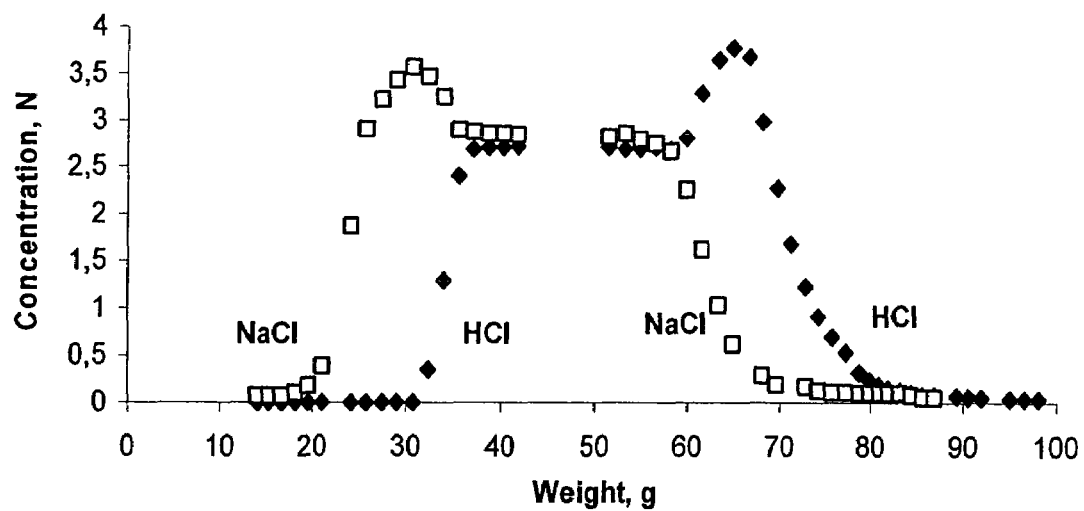
FIG. 7 is a chromatogram of mixture of NaCl and HCl separated in accordance with the method of the present invention on a column of activated carbons based on hypercrosslinked polystyrenes (D4609)
Figure 8:
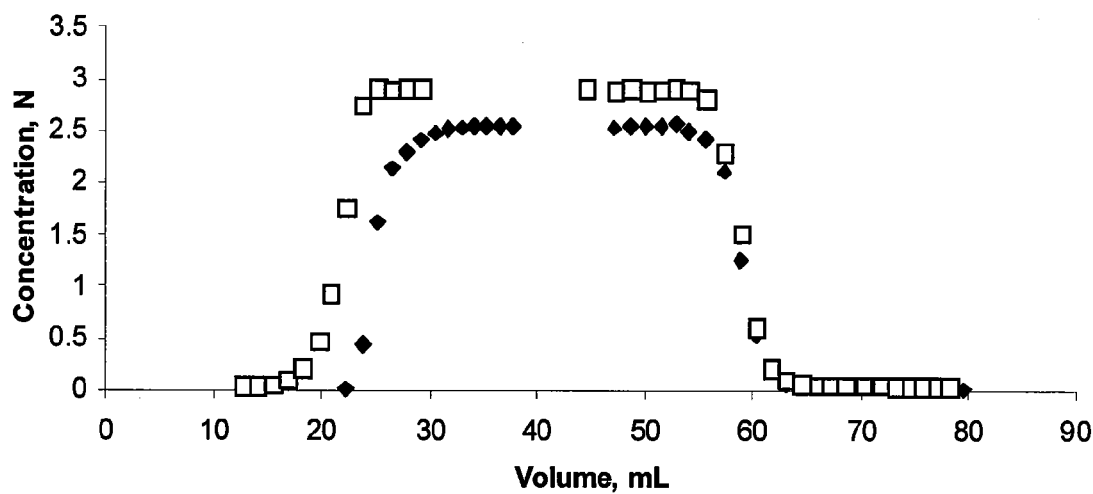
FIG. 8 is a chromatogram of mixture of NaOH and NaCl separated in accordance with the method of the present invention on a column of activated carbons based on hypercrosslinked polystyrenes (D4609)

As illustrated in FIG. 7, fronts of NaCl and HCl diverge by one third of the total bed volume (Δ=0.33), both in the forward and reverse experiments. In the pair NaCl/NaOH (FIG. 8), the largest ion is $Na^+$ for the both electrolytes, and only a poor separation is observed in the forward experiment (Δ=0.18) with no separation at the tail of the chromatographic zones. These results could not be explained, if we would try to compare sizes of cations $Na^+$ and $H^+$ in the first pair and anions $Cl^-$ and $OH^-$ in the second pair, though these ions distinguish the electrolytes in each pair and represent the target and the actual result of the separations. In contrast to the remarkable separation of the above NaCl/HCl pair, $Na_3PO_4$ is not separated from $H_3PO_4$, et al., on the same carbonaceous material. Certainly, hydrogen phosphates $Na_2HPO_4$ and $NaH_2PO_4$ dominate in the feed solution, and these large phosphate anions determine the migration velocity of both electrolytes. Smaller cations $Na^+$ and $H^+$ in this system are bound to follow the leading phosphate anions without being separated at the end.

Tables 2 and 3 demonstrate that alkali cations govern the separation, if combined with small anions, such as $Cl^-$, only. When judged by the values of Δ on all sorbents tested, the selectivity of separation of HCl from metal chlorides logically increases in the series $K^+<Na^+<Li^+<Ca^{2+}$, along with the increase in the radius of the above hydrated cations.

In combination with the larger anion $SO_4^{2-}$ (r=3.79 Å), only polyvalent cations have a chance to significantly contribute to the separation. Indeed, Cu(II), Fe(II), and Al(III) sulfates readily separate from sulfuric acid. Hydrated radii of these cations are estimated to amount to 4.19, 4.28 and 4.75 Å, respectively. Nightingale E. R. (1959) J. Phys. Chem. 63: 1381-1387.

Where hydrated cations exceed their anions in size, the breakthrough volumes of the salt correlate with the size of the cation. Thus, the largest cations appear in the effluent very early. Measured at the level of 5% of the zone height ($BtV_{0.05}$, ml), the sequence of elution of salts on sorbents examined is as follows:

MN-202: $Ca^{2+}(18)<Li^+(19.5)$;

MN-270: $Al^{3+}(13)≈Fe^{2+}(13)<Ca^{2+}(15)<Li^+(16)$; and

Carbon D4609: $Al^{3+}(14)<Fe^{2+}(15)<Ca^{2+}(17)<Na^+$ (19).

Influence of Concentration and "Salting-Out" Effects

Whereas ion chromatography and capillary electrophoresis, as efficient analytical techniques, develop toward increasing the sensitivity and resolution (efficiency), the present method of SEC of electrolytes may have an opposite application niche, i.e., preparative and industrial processing of concentrated solutions. For this reason, all of the above experiments were carried out on concentrated electrolyte mixtures, which is quite unusual for chromatography. From a theoretical viewpoint, the separation capacity of a size-exclusion column with respect to the volume of the sample has an upper limit that is determined by the total porous volume of the packing material. In the best possible case, the elution front of the smallest species can fall behind the front of a totally excluded component by the total volume of pores. The role of the concentration of species in SEC has not been previously studied. Fortunately, in our experiments, increasing the concentration of electrolytes in the sample was found to enhance not only the overall productivity of the process, but also the selectivity of separation.

Thus, raising the concentration of LiCl up to 12 N in its mixture with 0.06 N HCl was found to widen the gap between the breakthrough fronts of LiCl and HCl up to more than 5 bed volumes. Davankov. V. A, Tsyurupa M. P., Alexienko N. N. (2005) Mendeleev Commun., N 5: 192-195 suggests that an explanation of this unexpected phenomenon requires consideration of concentration gradients in the mobile phase. LiCl is excluded from a certain part of the porous volume and exists as the concentrated (12 N) solution in the interstitial space and within larger pores. Meanwhile, the mobile phase within smaller pores can be expected to become 0.06 N in HCl, only. Because of the extreme gradients in the concentration of common Cl⁻ anions, the latter are forced into those diluted domains of the mobile phase. Chloride ions can easily accumulate there in the form of HCl (not LiCl).

Since there is no movement of the mobile phase through the porous space, HCl remains retarded in the stagnant zones of small pores, until the concentration of common Cl⁻ anions there becomes comparable with that of the feed solution. This situation can be compared with known "salting-out" effects or with some kind of "retention" of HCl by an "immobilized liquid phase." This further relates to steric exclusion of larger species from the stagnant portion of the mobile phase in the micropores, combined with the gradient-driven exclusion of smaller species from the moving part of the mobile phase into the micropores. A porous material thus brings about differentiation in space of the two electrolytes confined in the porous space and, in addition, levels out concentration differences of these electrolytes with respect to the common ion.

Upon eluting the electrolytes from the column with water, HCl emerges in the effluent immediately after the LiCl zone in the form of a sharp zone with a concentration of up to 0.9 N, i.e., with a 15-fold self-concentrating effect.

Similar strong concentration gradients are believed to operate in many (not all) examined systems. Otherwise, it would be difficult to explain why two elution fronts in a mixture like NaCl/HCl diverge by as much as one-third of the column volume, in spite of the rather small difference between the sizes of the situation-determining ions of Na⁺ and Cr⁻. Here, "retention" of HCl in the "immobilized liquid phase" most likely contributes to its separation from NaCl by the size-exclusion effect. On the contrary, NaOH cannot be excluded into and "retained" in a stagnant, compartment of the mobile phase since no extra space is available to NaOH as compared to NaCl, both of which being restricted to the pores accessible for the same large Na⁺ cations.

Self-Concentrating Effects and Productivity of Separation

The practical value of a preparative chromatographic procedure is usually evaluated on the maximum volume of the sample that can still be tolerated by the column and the concentration of that sample. These two parameters usually counteract each other. From this viewpoint, the present method of SEC of electrolytes is superior to all other chromatographic techniques in that the volume loading of a column in many cases increases with the rise in the concentration of the feed. This phenomenon results from the unique advantage of this new technique, which becomes evident on working with concentrated feed solutions. Specifically, by employing the method of the present invention, the separated components appear in the effluent with remarkably enhanced concentrations.

Tables 2 and 3 illustrate this self-concentrating effect with the ratio $C_{max}/C_0$ between the maximum concentration of a component zone and the concentration of the component in the initial feed solution. Depending on the total concentration of the feed and the proportion of the components, the value of $C_{max}/C_0$ varies in a broad range, amounting to 15 in the above-discussed case of a dilute solution of HCl in a concentrated LiCl solution.

The self-concentrating phenomenon can be explained in terms of an "ideal separation process," defined as a process that does not introduce any additional matter (e.g., additional eluent) into separated fractions of the initial sample. In such a process, self-concentration is the unavoidable result of removing of one (or several) component from the initial mixture. It was also reasoned that the self-concentrating effect must be more pronounced for the minor components of the mixture: the more matter (i.e., major component) is withdrawn from the mixture, the stronger the concentration of the remaining minor components becomes. The minor component in this context is the one that occupies less space in the initial mixture. For an electrolyte it means that its concentration is smaller and/or its hydrated radius is smaller. Indeed, data in Tables 2 and 3 show that, at comparable concentrations of two components, the last eluted one is stronger concentrated, because its hydrated ions are smaller and occupy less space.

Figure 9:
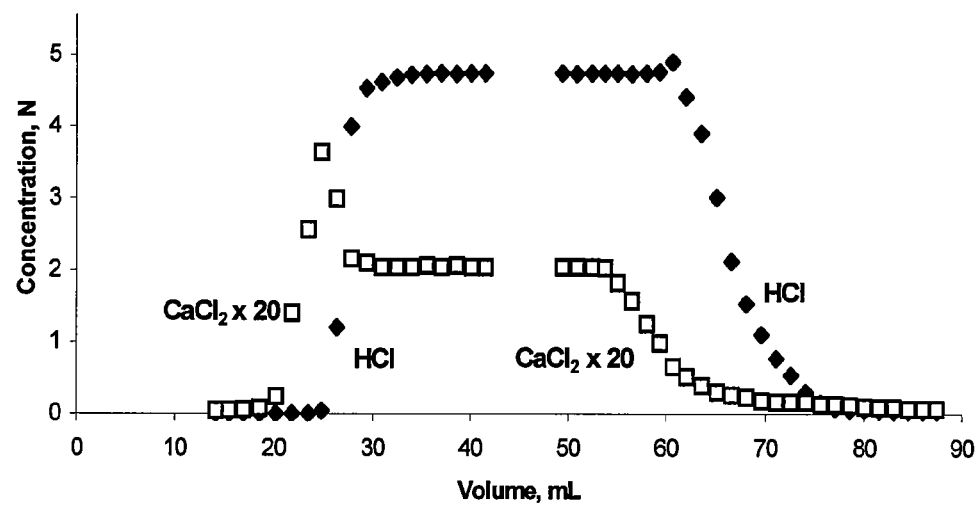
FIG. 9 is a chromatogram of a mixture of $CaCl_2$ and HCl separated on a column of activated carbons based on hypercrosslinked polystyrenes (D4609).

An extreme value of $C_{max}/C_0=15$ for the above example with 12 N LiCl and 0.06 N HCl is the result of combined action of three factors: low concentration of HCl, its smaller effective molar volume, and the above-discussed "salting-out" effect. An opposite result was achieved with a solution 5.0 N in HCl and 0.1 N in $CaCl_2$, separated on carbon D4609 (FIG. 9). Here, the concentration of $CaCl_2$ in the first eluting zone peaked up to 1.8 of the initial value, whereas concentration of the last eluting major component, HCl, rose insignificantly. In this system, the "salting-out" effect of the minor component into a small stagnant zone could not operate since $CaCl_2$ does not fit into the small pores. Besides, the factor of molar volume difference of the two electrolytes acts counterproductively. Hence, the smaller extent, 1.8, of the self-concentration of the minor component resulted, which was entirely due in this system to the separation, i.e., the removal of HCl from the minor component, $CaCl_2$.

The "ideal separation process" naturally divides the volume of the sample that was introduced into the column into two smaller parts, which raises the loadability of the column. If, in a favorable case, this factor combines with the "salting-out" effect of the minor component, the total productivity of the column increases substantially. In the above considered extreme case of removing trace HCl from the concentrated LiCl solution, more than 5 bed volumes of the feed can be processed before the two elution zones start overlapping. The minor component, HCl, that meanwhile concentrates in the column, elutes with water in the form of a sharp peak. Therefore, a reasonable measure of the column productivity P in the present SEC method could be the product of the zone width with the averaged self-concentrating coefficient. Thus obtained P-values are summarized in Tables 2 and 3, showing that the column productivity easily rises to 0.3-0.5 bed volumes for comparable concentrations of two electrolytes.

The present method has a significant impact on industry applications by reducing costs, energy, and pollution. The columns preferably used according to the present invention are neutral and do not require chemical regeneration, as is the case with other chromatography methods such as ion exchange. Rather, after a column is used to separate an electrolyte solution according to the above described procedure that consists of loading the column until the equilibration condition and then eluting the electrolytes with water, the column beads are already washed with water and the column is prepared to be used again.

A second basic manner of separating electrolytes according to the present invention involves introducing a certain portion of the initial mixed solution into the column, followed by eluting that portion with water, both passed through the column in same direction. The size of the feed portion can be selected in such a manner that at the outlet of the column only two zones appear, one composed of the largest ions, and the other of the smallest ions. The two target fractions can follow immediately one after the other or be separated by a very small zone of water. This kind of process, when properly optimized, suggests repeating many times the introduction of appropriate portions of the feed and water, so that the effluent of each cycle can be cut in two target fractions. This manner of separation can be easily automated and must be the most cost-efficient one.

Using neutral column packing materials, in addition to avoiding the use of any special chemicals for elution and column regeneration, provides another crucial benefit for a large-scale separation process—namely, that the volume of the neutral polymer bed remains constant during the whole process, regardless of the fact that the pH of the liquid and the electrolyte concentration sharply change, in an extremely large range, on the borders of chromatographic zones. This volume constancy makes it possible to apply really large packed columns. Contrary to that, sizes of ion exchange columns are severely limited by "breathing" of the column bed in the sorption/regeneration cycles. Stability of the volume of neutral hypercrosslinked polymers and carbon-type packings further enhances their mechanical integrity and life expectancy.

Thus, the present SEC method requires minimal energy output, avoids the use of additional chemicals for elution and regeneration cycles, and reduces the time and cost associated with separating electrolytes. Furthermore, the present method can be applied to uses in various fields and applications, such as industrial processing of concentrated solutions, electroplating, treatment of metals, and hydrometallurgy.

As previously mentioned, there are a wide number of potential applications for the size-exclusion chromatography (SEC) systems of the present invention. In general, the SEC technique is capable of separating higher molecular weight materials from materials with smaller sizes of molecules. Separations of this type may include purification of valuable proteins, peptides and amino acids, including enzymes and pharmacologically active peptides, from contaminating electrolytes, like ammonium chloride, ammonium sulfate or sodium chloride. Other types of products tha need to be separate from contaminating electrolytes and can be purified using present invention, are solutins of nucleic acids, sweeteners, plant extracts, drugs. Still, most promising fields of application of the present invention are processing of concentrated solutions of electrolytes. In chemical industry, such problems arise during manufacturing of phosphoric acid, pure sulfuric and hydrochloric acid, pure caustic solutions, many mineral salts and reagents. In hydrometallurgy, isolation of target metal salts from rather concentrated solutions of acids, alkali, cyanides or other complex-forming reagents are crucial steps in all process of leaching ores or metal concentrates during the manufacturing of copper, nickel, uranium, gold and other precious metals, aluminium, vanadium, rare earth metals and many other metals. Electrolytic purification of copper, nickel, cobalt and others involves processes of removing contaminant metals from the electrolytes. The same is true for all electrolytic plating processes. Surface purification of metals by etching or pickling with acids and alkaline solutions always deals with the problems of removing salts from pickling bath solutions.

As previously mentioned, the precise manner in which the SEC system of the present invention is employed will depend on the specific application. For example, the system can be designed in terms of a batch method or it can be designed according to a column method.

All references cited and/or discussed in this specification are incorporated herein by reference in their entirety and to the same extent as if each reference was individually incorporated by reference.

We claim:

1. A method of separating mixtures of electrolytes by size exclusion chromatography, comprising the steps of
passing a mixed solution of electrolytes containing a salt and a base through a material with a size and a structure selected so as to differentiate the ions according to their size in the solution,
washing the material with water, and
collecting separately fractions of an effluent that contain pairs of cations and anions of the salt and the base separated according to their size.

2. The method of claim 1, wherein the material with a size and a structure selected so as to differentiate the ions according to their size in the solution represents microporous neutral adsorbing materials.

3. The method of claim 2, wherein the microporous neutral adsorbing materials are selected from hypercrosslinked polymeric materials, porous carbonaceous materials, and mineral molecular sieves.

4. The method of claim 3, wherein the hypercrosslinked polymeric materials are selected from hypercrosslinked polystyrene materials prepared by post-crosslinking of styrene-divinylbenzene copolymers or by co-polymerization of styrene with more than 50 weight-% divinylbenzene in the presence of a polymer-solvating porogen.

5. The method of claim 3, wherein the hypercrosslinked polymeric materials are selected from hypercrosslinked polysulphone, polyarylate, and polyxylilene.

6. The method of claim 3, wherein the porous carbonaceous materials are prepared by pyrolysis of hypercrosslinked polystyrene materials.

7. The method of claim 3, wherein the mineral molecular sieves are selected from zeolites and microporous oxides of silica, alumina, zirconia and molybdenum.

8. The method of claim 2, wherein the microporous neutral adsorbing materials contain pores of 1.5 to 4.0 nm in size.

9. The method of claim 2, wherein the microporous neutral adsorbing materials contain pores larger than 5 nm in size, and pores of 1.5 to 4.0 nm in size.

10. The method of claim 1, wherein the material with a size and a structure selected so as to differentiate the ions according to their size in the solution is used in the form of beaded material or continuous bed.

11. The method of claim 1, wherein the mixed solution of the above electrolytes is an aqueous or aqueous-organic solution.

12. The method of claim 11, wherein the aqueous or aqueous-organic solution is selected from aqueous-methanolic, aqueous-ethanolic, or aqueous-isopropylalcoholic solution.

13. The method of claim 1, wherein the step of passing a mixed solution of the above electrolytes through a material with a size and a structure selected so as to differentiate the ions according to their size in the solution is conducted from the bottom of the column to its top, and the step of washing the material with water is conducted in the opposite direction, from the top to the bottom of the column.

14. The method of claim 1, wherein the steps of passing a mixed solution of the above electrolytes through a material with a size and a structure selected so as to differentiate the ions according to their size in the solution and washing the material with water are conducted by alternating introduction of portions of the feed solution and water both moving in same direction.

15. The method of claim 1, wherein the step of passing a mixed solution of electrolytes through a material with a size and a structure selected so as to differentiate the ions according to their size in the solution generates an eluent fraction of the electrolyte with the larger ions and the step of washing the material with water generates an eluent fraction with smaller ions, with both eluent fractions of both steps containing corresponding electrolytes with enhanced concentrations compared to their concentrations in the initial mixed solution.

16. A method of separating metal salts from bases by size exclusion chromatography, comprising the steps of passing a mixed solution of electrolytes through a material with a size and a structure selected so as to differentiate the ions according to their size in the solution, washing the material with water and collecting separately fractions of an effluent that contain first the metal salts and then the corresponding base separated according to the size of their ions.

* * * * *